United States Patent Office 2,989,384
Patented June 20, 1961

---

2,989,384
METHOD OF REGENERATING A GLASS ETCHING BATH
Richard E. Allen and Daphne L. Rothermel, Corning, N.Y., assignors to Corning Glass Works, Corning, N.Y., a corporation of New York
No Drawing. Filed Feb. 18, 1957, Ser. No. 640,568
9 Claims. (Cl. 41—42)

This invention relates to improvements in the selective etching process of chemically machining or sculpturing glass described in United States Patent No. 2,628,160 issued to Stanley Donald Stookey. It is more particularly concerned with hydrofluoric acid etching solutions used in the Stookey process and regeneration of such solutions to extend their useful life and provide for substantially continuous etching operations.

Briefly the Stookey process involves forming within a glass article a design comprising crystallites selected from the class consisting of a lithium silicate, barium disilicate and an alkali metal fluoride, while leaving the remainder of the glass article unaffected, and thereafter treating the glass with a dilute aqueous solution of hydrofluoric acid to preferentially disolve one portion of the glass. In glass articles containing such crystallite designs that portion of the glass containing crystallites is etched or dissolved by hydrofluoric acid at a different rate than is the remainder of the glass. The ratio of these different etching rates may be as great as 50 to 1 depending on such factors as glass composition, type of crystallite, and concentration, composition and temperature of the acid etching solution. In general optimum etching ratios are provided by lithium containing glasses having a lithium silicate type of crystallite formed therein. For purposes of illustration then, the present invention is described with reference to this type of glass wherein a crystallite containing glass etches more rapidly than a corresponding clear glass.

The process is capable of wide use in producing, from glass, intricately shaped and/or precisely patterned articles such as panels for flush printed circuitry, printing plates, screens, instrument panels and the like. It is also extremely valuable in producing accurately perforated glassware, an outstanding example being glass aperture masks for color television receiving tubes. Such masks consist of a thin glass sheet having thousands of accurately dimensioned and spaced holes per square inch of glass surface.

It has been apparent however that success in many of these applications ultimately depends on availability of a standardized continuous operation whereby an etching acid solution is used over an extended period of time for successively etching like glass articles in accordance with an established schedule. Experiments directed at this end have shown however that both glass etching rates, and the ratio of such etching rates in the clear, and crystallite containing portions, vary widely with concentration and composition of the hydrofluoric acid etching solution. A standardized process then requires some means of maintaining the etching solution at a constant concentration and composition.

The obvious expedient of using fresh solution is impractical because of the cost factor as well as the problem of waste acid disposal. Hence an effective means of solution regeneration becomes highly desirable and it is the primary purpose of this invention to provide such means.

It was initially thought that an acid etching bath could be regenerated by simply adding sufficient hydrofluoric acid to compensate for that consumed in etching, that is in reacting with the oxide constituents of the glass, and crystallites therein, to form corresponding fluorides. However attempts to employ a bath regenerated in this manner revealed that the etching rate of the faster etching, crystallite containing portion of a glass continuously decreased even though the apparent acid concentration of the bath was maintained constant. Experimental studies demonstrated that $H_2SiF_6$ was being produced during solution of $SiO_2$, a major glass constituent, and that a substantial portion of the apparent hydrofluoric acid present was therefore relatively ineffective for etching purposes. We found then that it was necessary to maintain a constant concentration of free HF, that is HF exclusive of that present as $H_2SiF_6$, in order to maintain a standard etching rate for crystallite containing glass.

This however proved to be only a partial solution of the problem since it then became apparent that, as an etching bath ages by being regenerated and reused in this manner, the differential etching rate decreases. That is to say the clear glass and crystallite containing glass portions of an article tend to etch at more nearly the same rate in such a bath even though the etching rate of the latter remains constant. We have now found that this most undesirable and unexpected change in differential etching rate is, surprisingly, also occasioned in large part, if not entirely, by the accumulation of $H_2SiF_6$ in the etching bath. While no good explanation can be offered for this unexpected difference in behavior between crystallite-containing glass and clear glass, the need for controlling concentrations of both HF and $H_2SiF_6$ in regenerated etching solutions is quite apparent.

An obvious remedy is to periodically replace a sufficient portion of the used acid with a suitable mixture of fresh acid and water to maintain the $H_2SiF_6$ at a low concentration and the free hydrofluoric acid concentration at the desired initial level. While this process is effective, it is of limited use and highly uneconomical since increasingly large amounts of otherwise utilizable hydrofluoric acid are discarded each time. It is apparent then that some method of controlling etching solution composition by neutralizing the $H_2SiF_6$ without affecting the hydrofluoric acid solution is needed and a further and more specific purpose of this invention is to provide such method.

We have discovered that a hydrofluoric acid bath can be effectively and economically regenerated by precipitating at least a portion of the $H_2SiF_6$ formed during the etching process, removing the precipitated silico fluoride salt from the bath and adding thereto sufficient fresh hydrofluoric acid to compensate for that consumed during etching and lost in the regenerating steps, thus restoring the hydrofluoric acid concentration in the bath to a predetermined level.

Any compatible, soluble salt, the metal ion of which forms a relatively insoluble silico fluoride and soluble fluoride, may be used for precipitation purposes. We have found however that potassium salts are particularly effective for the purpose. Care must be exercised in selecting the salt employed so as not to introduce into the bath an ion which either will interfere with subsequent etching or will have a detrimental influence on the equipment used. Nitrate and sulphate ions, for example, should be avoided where the corresponding acid formed by such ions may have a corrosive effect. Potassium fluoride may be used in accordance with the following reaction,

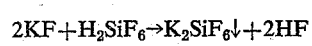

and introduces only fluoride ions already present in the bath. However this salt is rather expensive to use and necessitates making allowance for the amount of acid which it adds to the bath. For these reasons it is frequently preferable to use potassium carbonate, either anhydrous or hydrated, since, in accordance with the following reaction $$2K_2CO_3 \cdot 3H_2O + 2H_2SiF_6 \rightarrow 2K_2SiF_6\downarrow + 5H_2O + 2CO_2\uparrow$$

the carbonate ion decomposes and may therefore be disregarded as far as subsequent effect on either the process or equipment is concerned.

Ideally, during operation of the etching bath, the acid solution is continually circulated through a filtering arrangement with metered amounts of the precipitating solution being added, the exact amount being controlled by a device sensitive to the fluosilicic acid concentration in the solution. The silico fluoride salt formed is removed as the material is pumped through the filter and, while the filtered liquid is circulated back to the etching bath, metered amounts of hydrofluoric acid are added, the exact amounts again being controlled by a device sensitive to the hydrofluoric acid concentration. For most purposes however an elaborate arrangement of this sort and the precise control which it affords are quite unnecessary. In general then it is sufficient to periodically add a predetermined and measured amount of precipitating agent to the etching bath and circulate the entire bath through a filter with an intermediate settling bed being employed if desired. Conveniently a dual bath arrangement is provided so that one bath may be used while the other is being regenerated.

We have further found that for various reasons it is both unnecessary and undesirable to completely remove the $H_2SiF_6$ present in the etching bath. Thus when this acid is completely precipitated the regenerating bath frequently etches quite erratically. The reason for this has not been clearly ascertained. It is strongly suspected however that a super-saturated solution is in some way formed and that salts capable of blocking etching are thereafter deposited on any glass introduced into the regenerated bath. In accordance with one theory potassium ions remain in the regenerated solution and tend to gather on a new glass surface to interfere with etching. A second proposed theory suggests that the solubility of certain metal fluorides formed during etching, such as lithium fluoride, is related to the presence of $H_2SiF_6$, and that the solubility of such salts is so altered by complete removal of this material as to form a super-saturated solution. Regardless of the explanation however, our experiments have indicated the desirability of maintaining at least a small positive concentration of $H_2SiF_6$ at all times in a regenerated etching bath.

In etching processes, and particularly in the perforation of glass, it is frequently desirable to provide a controlled taper to the perforation. For example the successful operation of certain aperture or shadow masks in cathode ray tubes depends on providing the apertures or perforations with a controlled taper so that electrons are properly transmitted and not "clipped" or absorbed when they approach the mask perforations at a slight angle. Inasmuch as the differential etching ratio can be varied by varying the concentration of $H_2SiF_6$, it is therefore possible to correlate this acid concentration with the etching ratio so as to provide any desired degree of taper on the etched perforations. Thus, in producing aperture masks by etching glass having a differential etching ratio of about 35 to 1 in 10% hydrofluoric acid, we have found it convenient to operate with etching solutions in which the $H_2SiF_6$ concentration, expressed in terms of $SiO_2$, is maintained within a concentration range equivalent to 2–5% $SiO_2$. In general higher concentrations of $H_2SiF_6$ produce too great a taper, unduly lower the etching ratio and tend to produce an uneven surface on the etched glass, while lower concentrations do not provide adequate taper.

We have also found that in order to obtain the optimum results from a regenerated etching bath it is desirable to agitate the bath during etching and to maintain it at a temperature of about 25° C. or higher. With lower temperatures and/or a still bath there is a tendency for the etching ratio to vary erratically, probably due to partial retention of insoluble etch products on the glass. Agitation of the bath may be satisfactorily accomplished either by mechanically stirring the bath during etching, or by forcibly applying the acid to the surface being etched as by spraying.

By way of further illustrating our invention the process of regenerating an etching bath used in the production of glass aperture masks is described. Thin sheets of glass having the following approximate composition, 79.5% $SiO_2$, 10% $Li_2O$, 5% $K_2O$, 4% $Al_2O_3$, 1% ZnO, and minor amounts of photosensitizing and fining agents, were given a suitable photothermal treatment as described in the Stookey patent earlier referred to, to produce in the glass a desired pattern of crystallites for selective etching purposes. The glass sheets, thus treated, had a differential etching ratio of about 35 to 1. They were then successively suspended above an etching bath containing about 54.3 gallons of 10% HF solution and etched for a predetermined time (by splashing acid up against the down-surface of the glass plates) by a suitable rotary paddle arrangement to provide the desired tapered apertures in the sheets. During etching the metal fluorides LiF, KF, $AlF_3$ and ZnF, or complexes thereof, were formed, and the etched $SiO_2$ was converted into $H_2SiF_6$. Once the bath reached a concentration of such acid equivalent to 5% $SiO_2$, etching was discontinued and 40 pounds of $2K_2CO_3 \cdot 3H_2O$ added to the etching bath. The resulting slurry, containing precipitated potassium fluosilicate was filtered through a cloth filter and returned to the etching system with sufficient fresh 60% hydrofluoric acid and water to maintain the bath at a relatively constant volume and the free HF concentration at approximately 10%.

The precipitate removed by filtration was neutralized and discarded. Alternatively it might be dried and recovered as a by-product.

This process is of particular value in the production of aperture masks since there is virtually no limit to the number of times the bath may be regenerated. Furthermore, as indicated above, the bath is maintained constantly within the desired limits of $H_2SiF_6$ concentration for the production of suitably tapered perforations.

What is claimed is:

1. An improved method of etching selectively etchable glass with hydrofluoric acid which comprises forming fluosilicic acid, selectively removing only a portion of the fluosilicic acid and adding fresh hydrofluoric acid, the amounts removed and added respectively being sufficient to maintain the concentrations of both the fluosilicic acid and the hydrofluoric acid within predetermined limits.

2. The method of claim 1 wherein the fluosilicic acid is precipitated as an insoluble silicofluoride and removed by filtration.

3. The method of claim 2 wherein a potassium salt is added to the etching solution to precipitate potassium silico fluoride.

4. The method of claim 3 in which the salt added is potassium carbonate.

5. The method of claim 1 in which the etching solution is held at a temperature of at least 25° C. during etching.

6. The method of claim 1 in which the glass being etched is a lithium silicate glass.

7. A method of etching a differentially etchable glass article with a hydrofluoric acid solution to produce in the glass article perforations having a controlled degree of taper which comprises forming fluosilicic acid, selectively removing only a portion of this fluosilicic acid and adding fresh hydrofluoric acid in an amount sufficient to maintain the concentration of the free hydrofluoric acid constant, the amount of fluosilicic acid removed being sufficient to maintain the content of that acid in the etching bath within a range corresponding to the controlled degree of taper to which the perforations are being etched.

8. The method of claim 7 wherein the glass being etched has a differential etching ratio of about 35 to 1 in fresh 10% hydrofluoric acid and the fluosilicic acid is maintained within a concentration range equivalent to 2-5% $SiO_2$.

9. In selectively etching a silicate glass with a hydrofluoric acid etching solution wherein a portion of the glass has been photothermally treated to impart to it an etching rate different from that of the remainder of the glass, and wherein fluosilicic acid is formed in the etching bath, the improvement which comprises adding fresh hydrofluoric acid to the etching solution and selectively removing only a portion of the fluosilicic acid formed during etching, the amounts added and removed respectively being sufficient to maintain each of these acids at a concentration within predetermined limits, thereby providing controlled etching rates and etching ratio.

References Cited in the file of this patent

UNITED STATES PATENTS

| | | |
|---|---|---|
| 2,235,658 | Waterman | Mar. 18, 1941 |
| 2,278,257 | Gallagher | Mar. 31, 1942 |
| 2,428,464 | Lum et al. | Oct. 7, 1947 |
| 2,490,662 | Thomsen | Dec. 6, 1949 |
| 2,493,984 | McKay | Jan. 10, 1950 |
| 2,628,160 | Stookey | Feb. 10, 1953 |
| 2,669,048 | Easley et al. | Feb. 16, 1954 |

OTHER REFERENCES

Partington: Text Book of Inorganic Chemistry; Macmillan and Co., Ltd., London, 1953 (p. 668).